US009835328B2

(12) United States Patent
Lance

(10) Patent No.: US 9,835,328 B2
(45) Date of Patent: Dec. 5, 2017

(54) MULTIPURPOSE OUTDOOR GAS FIRE PLACE

(71) Applicant: Jeffrey S. Lance, Alpine, CA (US)

(72) Inventor: Jeffrey S. Lance, Alpine, CA (US)

( * ) Notice: Subject to any disclaimer, the term of this patent is extended or adjusted under 35 U.S.C. 154(b) by 165 days.

(21) Appl. No.: 14/814,715

(22) Filed: Jul. 31, 2015

(65) Prior Publication Data

US 2016/0033126 A1 Feb. 4, 2016

Related U.S. Application Data

(60) Provisional application No. 62/032,539, filed on Aug. 2, 2014.

(51) Int. Cl.

*A47J 37/07* (2006.01)
*F23D 14/28* (2006.01)
*F21S 13/12* (2006.01)
*F21V 37/00* (2006.01)
*F21W 121/00* (2006.01)

(52) U.S. Cl.

CPC .............. *F23D 14/28* (2013.01); *F21S 13/12* (2013.01); *F21V 37/0004* (2013.01); *F21W 2121/00* (2013.01)

(58) Field of Classification Search

CPC ........................................................ F21S 13/12
USPC ............................ 431/344; 126/38, 24, 90 R
See application file for complete search history.

(56) References Cited

U.S. PATENT DOCUMENTS 4,759,339 A * 7/1988 Hefling ..................... F24C 3/14 126/38
5,613,485 A * 3/1997 Covault .................... F24C 3/14 126/24
6,183,895 B1 * 2/2001 Kudo ................ H01M 8/04201 429/410

* cited by examiner

*Primary Examiner* — Avinash Savani
(74) *Attorney, Agent, or Firm* — Patent Success Strategies, LLC

(57) ABSTRACT

The present invention provides a multipurpose outdoor gas fire place having a frame with a gas outlet about its center and at least three adjustable radius arms for connecting to a gas canister housing, a gas line with an output control valve and a first end able to be securely connected to a gas canister through a pressure regulator and the second end able to be securely connected to a gas outlet and a cover-tray that fits over the gas outlet for burning gas. The arms have connectors on the ends for securing the frame to the gas canister housing that has an open top for receiving the cover-tray. The cover-tray distributes the gas about its middle and along its perimeter for burning gas and has a central adapter in line with the gas outlet for connecting a second gas burning element.

16 Claims, 5 Drawing Sheets

MULTIPURPOSE OUTDOOR GAS FIRE PLACE

CROSS-REFERENCE TO RELATED APPLICATIONS

The following application claims priority to provisional patent application Ser. No. 62/032,539 filed Aug. 2, 2014.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

TECHNICAL FIELD

The present invention relates to outdoor devices that use gas for providing heat, such as area heaters, cooking food, such as barbeques, atmosphere-illumination such as tiki torches and comfort such as fire places or fire pits.

BACKGROUND OF THE INVENTION

Most individuals have one or more gas powered devices in their backyards used to create atmosphere, provide a comfortable setting or to cook food outdoors. Some of these devices include well known items such as tiki torches, gas lamps, fire pits, area heaters and barbeques. Most of these devices require a liquid gas supply, a gas line between the gas supply and the active element of the device, a regulator and an output control valve that adjusts the flow of the gas from the supply canister to the active element. One disadvantage of having many of these devices simultaneously is the duplication of the gas supply elements including a separate gas canister, supply line and regulator/valve. This generally results in increased cost of purchasing these items as well as the cost of multiple gas supplies or a permanently installed utility gas supply.

Another disadvantage of having multiple devices can occur when the outside area is small. For example, having a barbeque, outdoor heater, chairs and a table may make a small patio or backyard cramped and confining. Consequently, individuals may be forced to consider the size of their outdoor area before purchasing gas powered devices. In such cases, the individual may have to settle on a less desirable or the exclusion of some devices due to size, space and cost constraints.

When these devices are not in use it may be desirable to store them until needed. Multiple gas powered devices can require a significant amount of space for storage and if an appropriate area is not available they are often stored together in a corner of the yard. In this circumstance, these areas of the yard can become unsightly, unusable and make retrieving a particular device more difficult.

Another concern is the volume of flammable liquid gas stored with or in multiple devices on the premises in a confined area. In certain states where wild fires are prevalent these areas become dangerous not only because they may explode and spread the fire to other areas and homes but when they explode they may injure fireman who are unaware that gas/flammable liquid storage canisters are present. Reducing the number of gas/flammable liquid canisters is possible but requires that the user connect or fill a canister each time they intend to use a particular device which is generally inconvenient.

Tiki torches come in both gas and flammable liquid fueled versions. This type of device may be used for illumination but is generally used to create a tropical atmosphere. These are usually constructed of bamboo shaft with wicker housing at the top for housing a canister filled with a flammable fluid. The housing usually comes with a top which secures the wick having one end in the flammable fluid and the other end extending above the top and carrying the flammable fluid for burning. The volume of fluid they can house is limited and they must be refilled regularly requiring storage and handling of replenishment fuel. In addition, they are usually constructed of combustible material and can easily Tip-fall over, and/or catch fire creating unacceptable additional fire hazards.

Consequently, there is a need for a gas powered device that may be utilized for multiple purposes thereby reducing cost by limiting the number of purchases, that does not occupy the area of multiple devices and limits the amount of flammable gas/liquids needed to be stored for or within a number of devices in one location.

SUMMARY OF THE INVENTION

The present invention provides a multipurpose outdoor gas fire place comprising a frame with a gas outlet about its center and having at least three adjustable radius arms for connecting to a gas canister housing, a gas line with an output adjustment control valve and a first end able to be securely connected to a gas canister through a pressure regulator and the second end able to be securely connected to a gas outlet and a cover-tray that fits over the canister housing and gas outlet frame for burning gas. The radius arms have connectors on the ends for securing the frame to the gas canister housing that has an open top for receiving the cover-tray. The cover-tray distributes the gas about its middle at a set distance from its center for burning gas and has a central adapter in line with the gas outlet for connecting a second gas burning element.

In one embodiment, the frame may comprise a central platform having a center portion and a perimeter edge, wherein the gas outlet is affixed about the center of the center portion and wherein the at least three adjustable radius arms are about evenly spaced and rotatably connected to the perimeter edge.

In another embodiment, the at least three adjustable radius arms have at least one of the following adjustable aspects/components, arm length and height, allowing for frame adjustment during assembly and facilitating canister housing variability in size, shape and depth. Pivot connectors enabling the frame to pivot upward for gas canister placement inside the gas canister housing and release/latch connector, releasing/anchoring the frame securely within said gas canister housing in the open/closed position.

In yet another embodiment, the multipurpose outdoor gas fire place further comprises an ignition switch.

In another embodiment, the cover-tray comprises a base plate having an upper surface, a lower surface, a perimeter edge, a central adapter and a gas directing vent attached to the upper surface. The base plate has an ascending skirt projecting upward along the perimeter edge and an outward projecting lip perpendicular to the ascending skirt. The central adapter has an upper end and a lower end, wherein the lower end comprises a gas-air venturi descending from the lower surface that is received by the frame and gas outlet. The cover-tray may further comprise a plug for closing and directing gas within the upper end of the central adapter and the cover-tray. The cover-tray may also comprise at least three legs about evenly spaced on the lower surface and along the perimeter edge of the base plate to prevent the gas-air venturi from damage and to provide cover tray at rest stabilization when removed from the gas canister housing.

Other aspects of the present invention include a second gas burning element. This element may be an area heater, a barbeque, a torch, a lamp or other optional burning elements, all controlled by the central gas output adjustment control valve. When the second gas burning element is an area heater or an illuminating element, it may comprise a tubular housing, a gas conduit within said tubular housing and a burning element. The conduit has a top end and a bottom end. The bottom end has a sleeve to be received by a central adapter of a multipurpose gas fire place and a pressure fit connector to receive a gas outlet within the sleeve. The top end has an adjustable gas release nozzle-venturi burning element.

When the second gas burning element is an outdoor barbeque element it may comprise a rigid or flexible gas conduit and a burning element. The conduit has a top end and a bottom end. The bottom end has a sleeve to be received by a central adapter of a multipurpose gas fire place and a pressure fit connector to receive a gas outlet within the sleeve. The top end has an adjustable gas release nozzle-venturi that may be received by the barbeque burning element.

When the second gas burning element is an outdoor torch element it may comprise a tubular housing and a gas conduit within the tubular housing. The conduit has a top end and a bottom end. The bottom end has a sleeve to be received by the central adapter of a multipurpose gas fire place and a pressure fit connector to receive a gas outlet within the sleeve. The top end has an adjustable gas release nozzle-venturi burning element. The outdoor torch element may further comprise a cap for covering the gas release nozzle-venturi when the gas burning torch is not in use.

DETAILED DESCRIPTION

Figure 1:
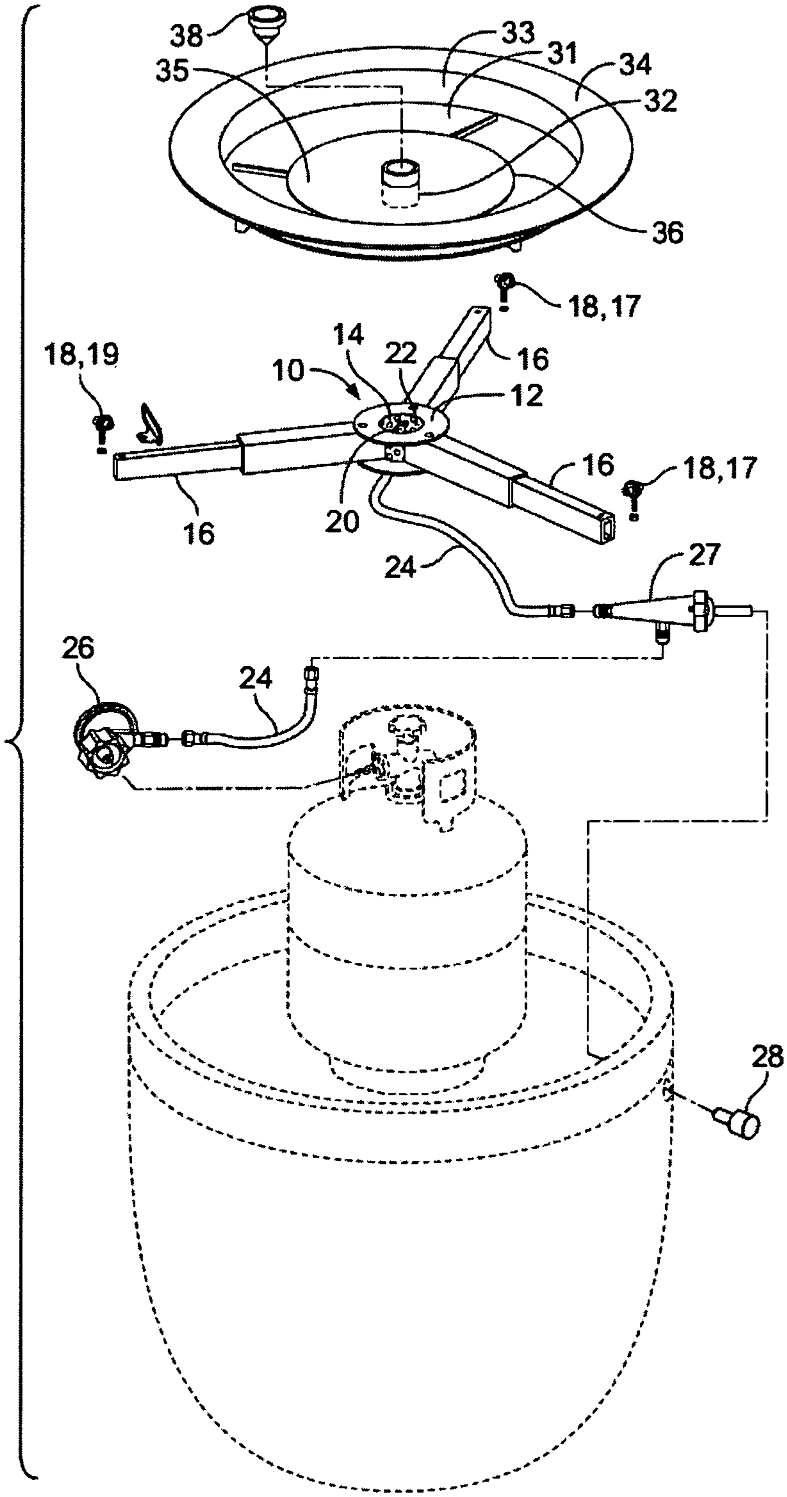
FIG. 1: is a diagrammatic representation of a muiltipurpose outdoor gas fire place showing the cover tray and plug, frame and gas line.
Figure 2:
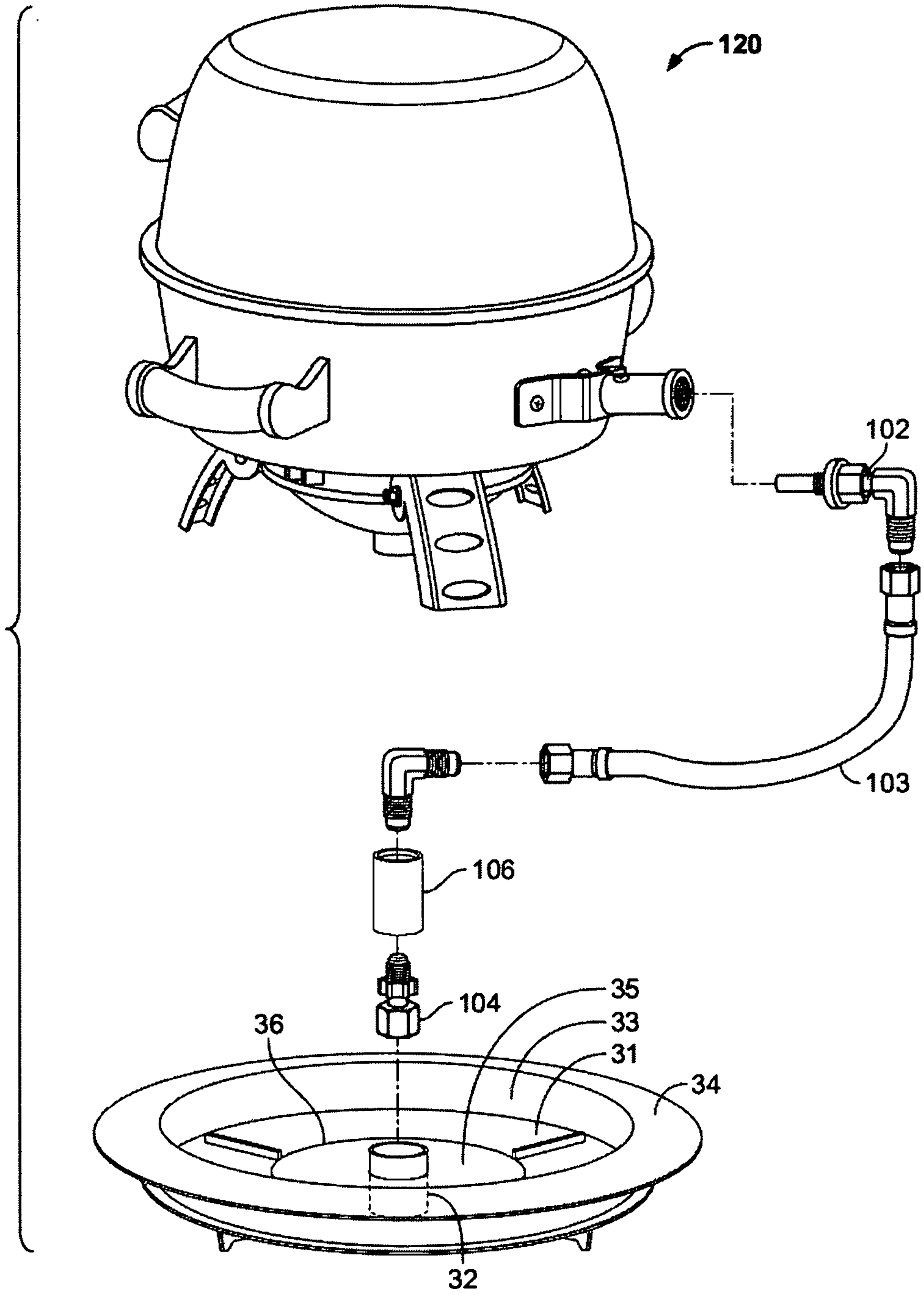
FIG. 2: is a diagrammatic representation of gas burning barbeque element of a multipurpose outdoor gas fire place showing a flexible gas conduit having an adjustable gas release nozzle venturi on one end and a sleeve adapter on the other end able to receive the central adapter and gas outlet of the frame.
Figure 3:
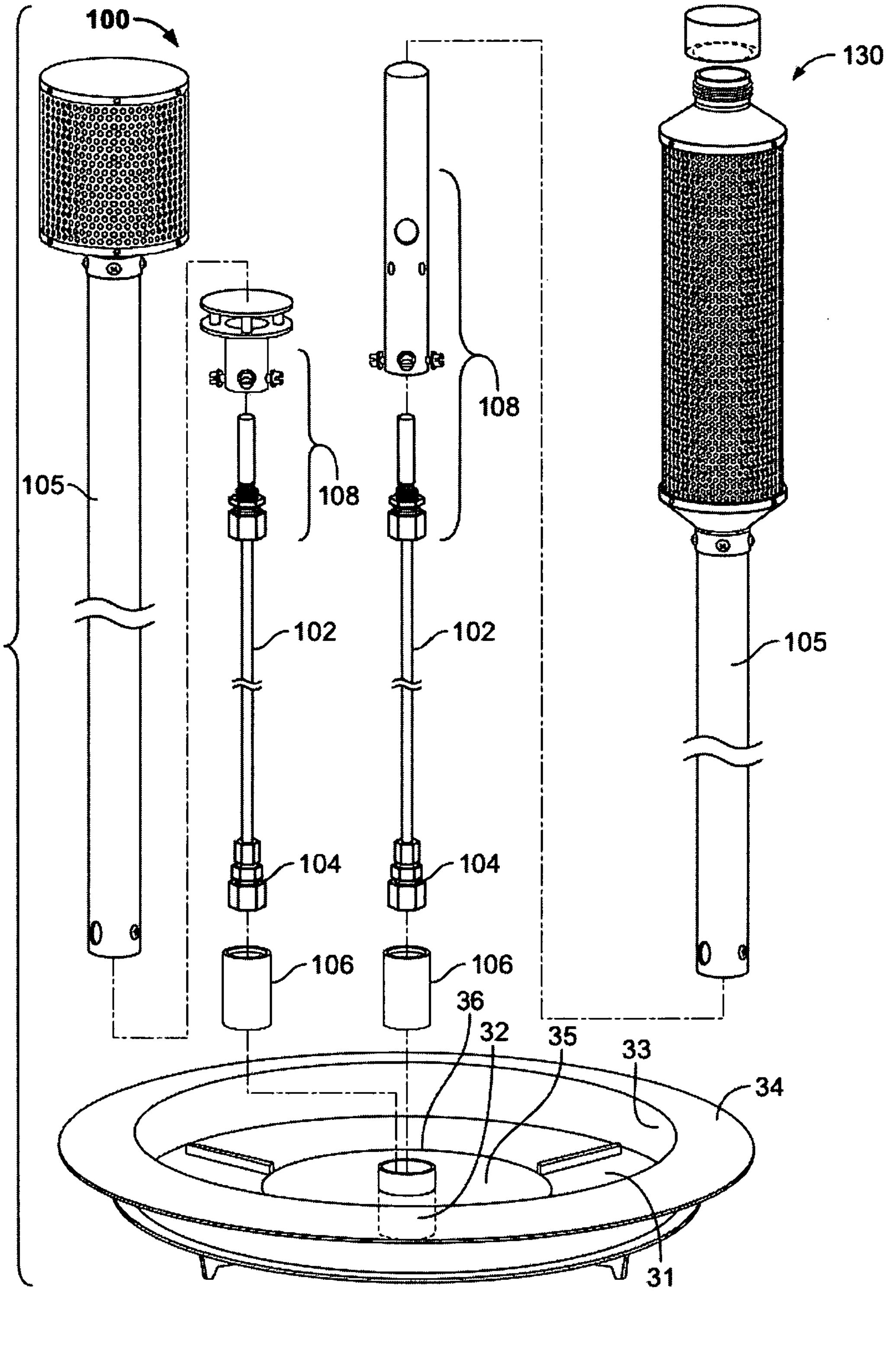
FIG. 3: is a diagrammatic representation of (A) a gas burning outdoor heater element and (B) a gas burning outdoor torch element both showing a tubular housing, a gas conduit within said housing and a heating element wherein the gas conduit has an adjustable gas release nozzle venturi connected to the heating element on one end and a sleeve adapter on the other end able to receive the central adapter and gas outlet of the frame.
Figure 4:
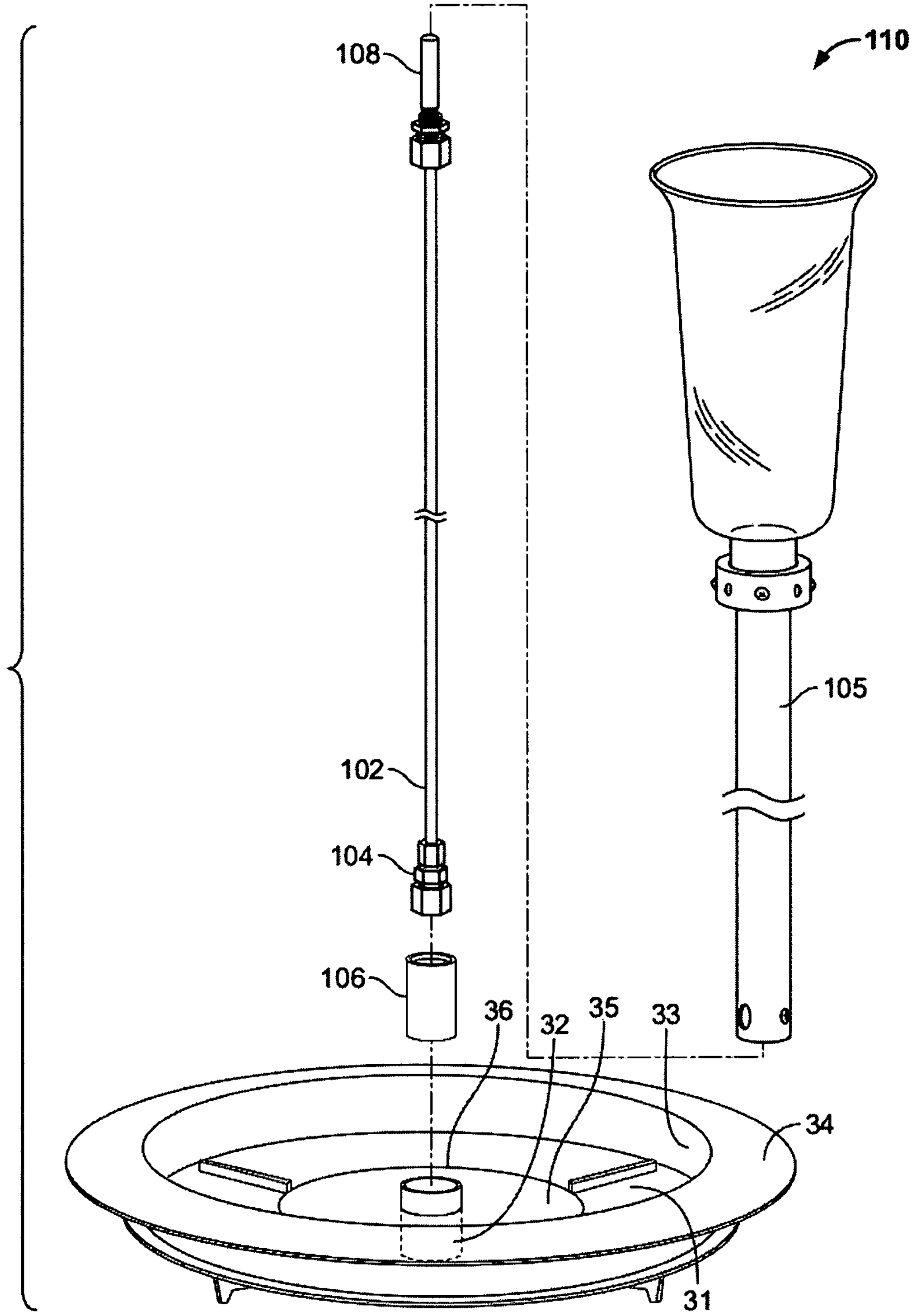
FIG. 4: is a diagrammatic representation of a gas burning outdoor lamp showing a tubular housing, a gas conduit within said housing and a burning element wherein the gas conduit has an adjustable gas release nozzle venturi connected to the burning element on one end and a sleeve adapter on the other end able to receive the central adapter and gas outlet of the frame.
Figure 5:
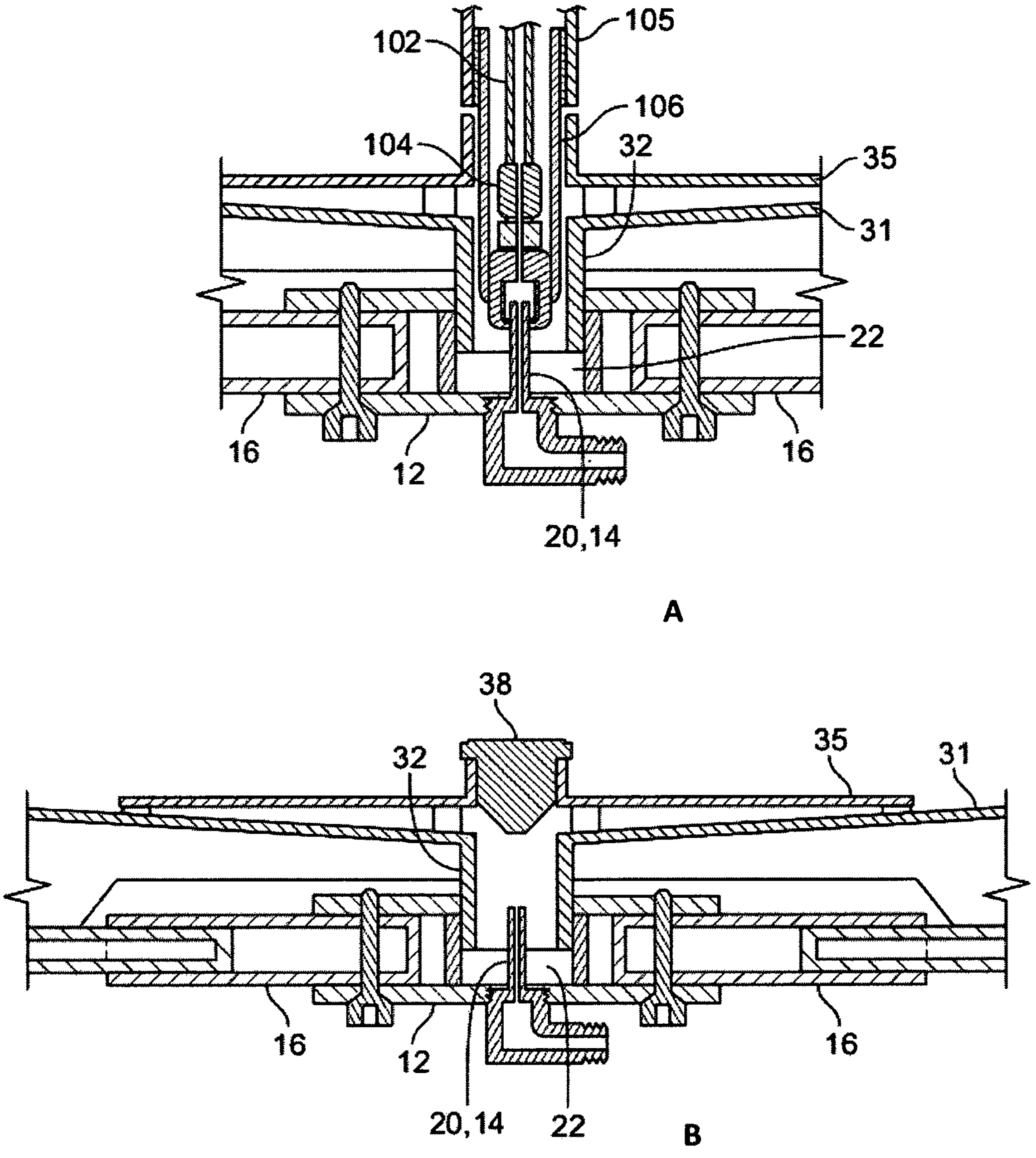
FIG. 5: is a cross sectional view of a multipurpose outdoor gas fire place (A) with an adapter of a gas burning outdoor element affixed within the multipurpose outdoor gas fire place and (B) with plug covering gas burning element adapter aperture when no gas burning element is in use.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail.

The term "about" as used herein refers to the ranges of specific measurements or magnitudes disclosed. For example, the phrase "about 10" means that the number stated may vary as much as 1%, 3%, 5%, 7%, 10%, 15% or 20%. Therefore, at the variation range of 20% the phrase "about 10" means a range from 8 to 12.

When the terms "one", "a" or "an" are used in the disclosure, they mean "at least one" or "one or more", unless otherwise indicated.

The term "connector" as used herein refers to a variety of devices known to those skilled in the art for affixing one element to another. The connection may be dynamic or static. For example when the connector is dynamic, it may allow one element to separate from another such as a hook and eye ring, rotate one about the other such as the frame arms ability to rotate from side to side on the perimeter edge of the central platform or pivot about one another such as the connector that allows the frame to pivot up and to one side of the gas canister housing to allow inserting or replacement of the gas canister. If the connector is static, one element is securely affixed to another in a way that does not allow either of the elements to move about one another.

The term "adapter" as used herein refers to a device known to those skilled in the art that interfaces one element of the invention with another. Generally the adapter makes a secure connection to allow open communication from one element to another. For example, the pressure regulator has a threaded adapter on one end for securing the regulator to the gas canister that allows gas to flow from the canister through the regulator and through a gas line to a second adapter that connects to a gas outlet where the gas may be burned.

The present invention provides a multipurpose outdoor gas fire place comprising a frame with a gas outlet about its center and having at least three adjustable radius arms for connecting to a gas canister housing, a gas line with an output adjustment control valve and a first end able to be securely connected to a gas canister through a pressure regulator and the second end able to be securely connected to a gas outlet and a cover-tray that fits over the gas outlet for burning gas. The radius arms have connectors on the ends for securing the frame to the gas canister housing that has an open top for receiving the cover-tray. The cover-tray distributes the gas about its middle a distance from its center for burning gas and has a central adapter in line with the gas outlet for connecting a second gas burning element.

1. Frame

The frame 10 has a central body 12 with a gas outlet 14 affixed within and about the center of the central body 12. There are at least three radius arms 16 connected to the central body 12 and about evenly spaced along the perimeter edge of the central body 12. These arms 16 may be fixed in length or they may be adjustable. Each of the arms 16 has a connector 18 on its end for securing the frame 10 to the interior of a gas canister housing. In a three adjustable arm configuration, for example, the connectors 18 on two adjustable arms 16 are pivot connectors 17 while the remaining adjustable arm connector is a securing mechanism 19 that when opened allows the frame to be pivoted upward and to one side of the gas canister housing for easy insertion or replacement of a gas canister. In the closed position, the frame 10 is anchored within the central opening of the gas canister housing. The frame 10 may be made of a variety of materials including metal, or polymer. Further each element of the frame 10 may be made of the same material or different materials. For example, the central body 12 may be made of metal and the arms 16 may be made of polymer. In one embodiment, the entire frame 10 is made of a metal such as aluminum.

The frame central body 12 provides for tray-cover alignment, interface and support structure for the gas outlet 14 as well as connection for the at least three radius arms 16. In one embodiment, the central body 12 is comprised of two metal disks 11 one circular shaped and one donut shaped. The metal disks are connected about their center with a tubular filter screen 13 fitted between the disks 11. The gas outlet 14 is secured within the center of the base circular shaped metal disk 11 with its nozzle end 20 projecting upward into the area surrounded by the tubular filter screen 13. The filter screen 13 allows air to circulate within the tubular filter screen 13 area and around the gas outlet 14 as well as preventing unwanted material from reaching the cover-tray gas venture, or nozzle 20, during use. It also acts as an adapter base bracket, or central adapter 22, for securing other gas burning elements to the device, such as the heater element 100, lamp element 110, barbeque element 120 and torch element 130. The base of the gas outlet 14 is configured to receive the adapter of the gas line. In one embodiment, the base of the gas outlet 14 is threaded and able to receive a threaded adapter of the gas line.

The frame radius arms 16 may be secured to the central body 12 so that they are fixed or may rotate from side to side. In a fixed configuration, the arms 16 may be riveted, bolted or welded in place. Other methods known to those skilled in the art may also be used. In a dynamic configuration, the arms 16 may be bolted using a method that allows the arms to freely rotate from side to side. A variety of methods known to those skilled in the art may be utilized. In one embodiment, the arms 16 are not of fixed length but are adjustable. A variety of adjustable configurations may be utilized. For example, in one adjustable configuration, the radius arms 16 are prepared in two sections with one section able to fit snugly within the other and secured so that the smaller section does not disengage from the larger section. In this telescoping configuration, the larger diameter section is connected to the central body 12.

The ends of the radius arms 16 comprise connectors 18 for securing the frame 10 within the opening of a gas canister housing. In one embodiment, one or two of the arms 16 will contain pivot connectors 17 while the remaining arms 16 contain releasable connectors, or securing mechanisms 19. A variety of pivot connectors 17 known to those skilled in the art may be utilized with the present invention. In one embodiment, the pivot connector 17 is a ball joint connector having one end fastened to the arm 16 and one end secured to the gas canister housing. Correspondingly, a variety of releasable connectors 18 may be utilized for securing the remaining arms 16 to the gas canister housing. In one embodiment, the releasable connector, or securing mechanism 19, is an adjustable eye loop secured to the top of an adjustable radius arm 16 that is received by a rod affixed to, and extending from, the interior of the gas canister housing. Alternatively, a spring loaded eye loop may be secured to a non-adjustable arm 16 so that the eye loop may be retracted until the rod is in place and then released, slipping the eye loop over the rod, and securing the frame 10 in place.

2. Gas Line

The gas line 24 is a tubular connection providing open communication for gas to flow between the gas canister and the gas outlet 14. The gas line 24 may be purchased commercially and may be made of a variety of materials known by those skilled in the art for preparing gas lines. In the present invention, the gas line 24 has an adapter on each end, one for securing the line to the gas canister and one for securing the line to the gas outlet 14. In one embodiment, the adapter is a rotatable threaded nut affixed to the end of the gas line 24 that provides a gas tight connection to the gas canister and/or gas outlet 14.

A pressure regulator 26 may be provided on one end of the gas line 24 for connecting to the gas canister. The output control valve 27 is provide along the gas line 24. In one embodiment, the pressure regulator 26 is provided on the gas line 24 near the gas canister. In another embodiment, the output control valve 27 may be fixed or adjustable. If the output control valve 27 is adjustable, it may have a rotating control that when turned in one direction increases the flow of gas to the gas outlet 14 and when turned in the opposite direction reduces the flow of gas to the gas outlet 14. In one embodiment, the regulator 26 is fixed with an output flow adjustment valve and knob 28 that is provided on the exterior of the gas canister housing for ease of use.

In another embodiment an ignition electrode is provided near the gas outlet for igniting the gas. The ignition electrode may be a push button ignition switch and may be provided separately or as part of the knob 28 used for regulating the gas flow. In one embodiment, the adjustable output flow valve knob 28 when turned regulates the gas flow and when depressed issues a spark from the ignition electrode to ignite the gas. The ignition electrode may be secured in any number of locations best fitting gas ignition on the cover-tray and for/on each second burning device.

3. Cover-Tray

The cover-tray 30 fits over the opening of the gas canister housing enclosing the housing during use and directs gas from the gas outlet 14 to desired locations within the tray 30. If flames are desired throughout the tray 30, say for example in a ring, then the gas is directed to openings about the middle of the tray 30 in a pattern that follows the perimeter edge of the gas canister housing. For example, if the gas canister housing is cylindrical or round the gas is directed to about the middle of the cover-tray 30 in a circular ring. Correspondingly, if the gas canister housing is in the shape of a square the gas may be directed to about the middle of the tray 30 producing flames in a square pattern. If the gas canister is in the shape of an elongated rectangle the gas may be directed to about the middle in a single line about the center of the tray 30.

The cover-tray comprises a central tubular shaft 32 that fits within the tubular filter screen, or central adapter 32, of the central body 12 of the frame 10. It has a base with sides prepared in the shape and size sufficient to be received by the opening of a desired gas canister housing. For example, if the gas canister housing were a large round clay pot with an opening of about 20 inches in diameter, then the tray would have a base 31 circumference of about 18 to 19 inches with sides 33 of about 1.5 to 2 inches and an outwardly extending lip 34 increasing the overall diameter to about 21 to 24 inches. In one embodiment, vents 36 may be provided that direct the gas to openings in the base of the tray 30 to release the gas for burning in the desired pattern. This may be accomplished by a variety of methods known to those skilled in the art. In one example, the central tubular shaft 32 is affixed to a circular cover-tray 30 on one end that is affixed to a flat circular disk 35 about one-half the diameter of the cover-tray 30 leaving spaced openings between the tray 30 and the disk 35 to allow gas to be released and burned on the other end. The central tubular shaft adapter 32 remains open to receive the gas outlet 14 on its lower end and a gas burning element on its upper end. When a second gas burning element is absent, a plug or cap 38 is used to cover the upper end of the central tubular shaft adapter 32 directing the gas to the spaced openings between the tray 30 and the flat circular disk 35 for burning.

In one embodiment, the tray 30 has a depth sufficient to hold non-flammable materials such as pebbles, small stones, glass beads and the like that cover the base of the tray 30 for esthetic purposes and a slightly concave base that facilitates drainage from rain and or other sources of water that may contact the outdoor multipurpose fire place.

4. Second Gas Burning Element

A variety of gas burning elements specifically designed to be received by the central tubular shaft 32, or central adapter, of the cover-tray 30 may be utilized with the present invention such as a gas burning element for heat 100, light 110, cooking food such as a barbeque 120 or ambiance such as a tiki torch 130. In each case, the components that direct the gas to the burning element are similar. Each comprises a gas conduit 102 that directs gas from the gas canister to the burning element 103. This conduit 102 may be made of a variety of materials known to those skilled in the art for this purpose. In one embodiment, the conduit 102 is made of aluminum.

The bottom end of the conduit 102 is provided with a pressure fit connector 104 to receive the gas outlet 14 and an outer cylindrical housing, or sleeve 105, about the connector 104 for fitting snugly within the central adapter 32 of the cover-tray 30. The top end of the conduit 102 is provided with an adjustable gas release nozzle venturi gas burning element 108. These ends may be secured on the conduit 102 by a variety of methods known to those skilled in the art such as an adhesive, a pin or screw threads and the like. In one embodiment, the conduit 102 has threads on the exterior surface of the ends to receive the pressure fit connector 104 and the gas burning element 108.

A variety of pressure fit connectors 104 known to those skilled in the art may be utilized for receiving the gas outlet 14. In one example, the pressure fit connector 104 is a brass compression coupling wherein the compression ring within the coupling is replaced with a polymer washer. The internal diameter of the polymer washer is reduced when the coupling is tightened. This provides a gas tight seal when the gas outlet 14 is fitted through the polymer washer in the coupling.

A variety of gas release nozzle-venturi 108 may be utilized with the present invention. The size of the nozzle venturi will depend on the amount of gas desired to be released for burning and the type of element used. For example, a gas nozzle venturi selected 108 for a heating element 100 may be larger than that selected for a barbeque 120.

The housing of each of the gas burning elements will vary depending on their purpose. For example, the gas burning heater 100, light 110 and tiki torch 130 may all have cylindrical housings 105 that elevate the gas burning element 108 a few feet above the ground. A variety of heater elements known in the art may be provided on the end of the cylindrical housing 105 and in communication with the gas conduit 102. These types of heaters generally radiate heat in a 360° circumference about the heating element. Correspondingly, a variety of gas burning lights 110 known in the art may be utilized at the end of the cylindrical housing 105 and in communication with the gas conduit 102. A tiki torch element 130 may provide the well-recognized flammable liquid storage canister at its top for aesthetic reasons even though gas is being provided directly from the gas conduit 102.

When the gas burning element is a barbeque 120, a variety of barbeques sold commercially may be easily adapted for use with the present invention. For example, the end of the burner element may be connected to a flexible gas line 103 having a pressure fit connector 104 to receive the gas outlet 14 with an outer cylindrical housing about the connector 104 for fitting snugly within the central tubular shaft adapter 32 of the cover-tray 30. In one embodiment, the base of the barbeque 120 is provided with legs of the same or smaller diameter than the cover-tray 30. During use the flexible gas line 103 connected to a short gas conduit 102 having a connector 104 to receive the gas outlet 14 and central tubular shaft adapter 32 is affixed to the gas burner. The other end is connected to the gas outlet 14 and the barbeque is rested within/on the cover-tray 30. The legs are provided with sufficient height so that the base of the barbeque 120 does not interfere with the gas outlet 14 connection.

Use

The device may be provided separately or with a gas canister housing. If provided separately, the purchaser installs the necessary elements on the interior of the desired gas canister housing for receiving the device. In one embodiment, these elements are affixed within the gas canister housing by the use of screws. These include the arm connection elements, gas output adjustment control valve and ignition switch if provided. Once in place the radius arms of the device are connected to these arm connection elements to secure the frame within the gas canister housing. A variety of connectors such as brackets or eye loops may be utilized with the present invention. In addition, they may be provided with bushings so that when they are secured in the sides of the gas canister housing they do not crush the material used to make the canister. For example, if the gas canister housing is made of pottery, the bushings prevent the head and nut of the element from compressing the ceramic and causing it to fracture.

Depending on the size and shape of the gas canister housing, the frame of the device may be provided with pivoting adjustable radius arms. This allows for the arms to be rotated from side to side to the appropriate radial symmetry and the telescoping arms may be adjusted to reach the elements mounted in the gas canister housing. Further, the frame is provided with one or two arms that are affixed to the interior of the gas canister housing by pivotal elements. These pivotal elements allow the frame to be pivoted upward away from the opening of the gas canister housing to permit the insertion or replacement of a gas canister within. Further, at least one of the remaining arms is a releasable connector having an open position allowing the frame to be pivoted upward for inserting a gas canister and a closed position securing the frame in place during use.

Prior to use the cover-tray is removed from the top of the gas canister housing, the user disengages the releasable connector and the frame pivoted upward away from the opening of the gas canister housing on the pivotal connectors. A gas canister is placed in the housing, connected to the gas line/regulator and the frame pivoted downward over the gas canister and secured in place by closing the releasable connector. The cover-tray is then replaced on the top of the gas canister housing making sure that the central tubular shaft adapter-venturi receives within the tubular guide and filter screen of the central body of the frame. If a fire pit function is desired, a cap or plug is placed over the central tubular shaft adapter to divert the gas to the directing vent of the cover-tray. The gas flow is activated by turning the gas output adjustment control valve and lighting the gas near the opening of the gas directing vent on the cover-tray. Alternatively, if another burning element is used, the plug/cap is removed, the end of the element is inserted into the central tubular shaft adapter thereby diverting the gas to the second burning element. The gas flow is activated by turning the gas output adjustment control valve and lighting the gas near the opening where gas is released from the burning element. For example, the gas may be lighted at the top of the tiki torch, the heating radiator element, the lighting element or the barbeque burner element.

In another embodiment, the device may also comprise an ignition electrode. The electrode may be activated by a separate push button or may be integrated into the gas output adjustment control valve. For example, turning the gas output adjustment control valve button will regulate the gas flow while pressing the valve button activates the ignition electrode igniting the gas.

When a particular element is desired the plug or cap on the central tubular shaft adapter is removed and the gas burning element of interest is inserted into the tubular shaft. The gas is then released and ignited.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof.

What is claimed is:

1. A multipurpose outdoor gas fire place comprising, a frame having at least three adjustable arms for connecting to a gas canister housing having an open top and a gas outlet about the center of said frame, wherein said arms have connectors on the ends for securing said frame to said gas canister housing, wherein said at least three adjustable arms have a first adjustable arm component and a second adjustable arm component wherein said second adjustable arm component fits slidably into said first adjustable arm component;

a gas line having a first and second ends, said first end having a pressure regulator with a first adapter for securely connecting to a gas canister, the second end having a second adapter for securely connecting to said gas outlet and a gas output adjustment control valve between said first and said second ends; and a cover-tray that fits over said gas outlet and covers said open top of said gas canister housing, said cover-tray distributing gas about the middle a distance from said cover-tray center for burning gas and having an central adapter in line with said gas outlet for connecting a second gas burning element.

2. A multipurpose outdoor gas fire place according to claim 1, wherein at least one of said adjustable arm connectors is an adjustable pivot connector allowing said frame to be pivoted upward to allow a gas canister to be placed inside said gas canister housing.

3. A multipurpose outdoor gas fire place according to claim 1, wherein at least one of said adjustable arm connectors is a releasable connector having an open position and a closed position, in said open position said frame is able to be pivoted upward to allow a gas canister to be inserted into said canister housing and in said closed position the frame is anchored within said gas canister housing.

4. A multipurpose outdoor gas fire place according to claim 3, wherein said releasable connector is an adjustable eye loop connected to said end of said at least one adjustable arm to be received by a rod affixed to the gas canister housing.

5. A multipurpose outdoor gas fire place according to claim 1, wherein said frame further comprises a central platform having a center portion and a perimeter edge, wherein said gas outlet is affixed about the center of said center portion and wherein said at least three adjustable arms are about evenly spaced and rotatably connected to said perimeter edge.

6. A multipurpose outdoor gas fire place according to claim 1, further comprising an ignition switch.

7. A multipurpose outdoor gas fire place according to claim 1, wherein said cover-tray comprises a base plate having an upper surface a lower surface, a perimeter edge, a central adapter and a gas directing vent attached to said upper surface, wherein said base plate having an ascending skirt projecting upward along said perimeter edge and an outward projecting lip perpendicular to said ascending skirt and wherein said central adapter has an upper end and a lower end, wherein said lower end central adapter comprises a gas-air venturi descending from said lower surface that receives said frame and said gas outlet.

8. A multipurpose outdoor gas fire place according to claim 7, wherein said cover-tray further comprises a plug for closing and directing gas within said upper end of said central adapter and said cover-tray.

9. A multipurpose outdoor gas fire place according to claim 7, wherein said cover-tray further comprises at least three legs about evenly space on said lower surface and along said perimeter edge of said base plate.

10. A multipurpose outdoor gas fire place according to claim 1, wherein said second gas burning element is a heater, a barbeque, a torch, a lamp or other optional burning elements, all controlled by the central gas output adjustment control valve.

11. A multipurpose outdoor gas fire place according to claim 1, further comprising a gas canister housing having an open top.

12. A multipurpose outdoor gas fire place comprising, a frame having at least three adjustable arms for connecting to a gas canister housing having an open top and a gas outlet about the center of said frame, wherein said arms have connectors on the ends for securing said frame to said gas canister housing, wherein said at least three adjustable arms have a first adjustable arm component and a second adjustable arm component wherein said second adjustable arm component fits slidably into said first adjustable arm component;

a gas line having a first and second ends, said first end having a pressure regulator with a first adapter for securely connecting to a gas canister, the second end having a second adapter for securely connecting to said gas outlet and a gas output adjustment control valve between said first and said second ends;

a cover-tray that fits over said gas outlet and covers said open top of said gas canister housing, said cover-tray distributing gas about the middle a distance from said cover-tray center for burning gas and having an central adapter in line with said gas outlet for connecting a second gas burning element; and a heater element comprising a tubular housing, a gas conduit within said tubular housing and a heating element wherein said conduit having a top end and a bottom end, said bottom end having a sleeve to be received by a central adapter of a multipurpose gas fire place and a pressure fit connector to receive a gas outlet within said sleeve and said top end having an adjustable gas release nozzle-venturi connected to said heating element.

13. A multipurpose outdoor gas fire place comprising, a frame having at least three adjustable arms for connecting to a gas canister housing having an open top and a gas outlet about the center of said frame, wherein said arms have connectors on the ends for securing said frame to said gas canister housing, wherein said at least three adjustable arms have a first adjustable arm component and a second adjustable arm component wherein said second adjustable arm component fits slidably into said first adjustable arm component;

a gas line having a first and second ends, said first end having a pressure regulator with a first adapter for securely connecting to a gas canister, the second end having a second adapter for securely connecting to said gas outlet and a gas output adjustment control valve between said first and said second ends;

a cover-tray that fits over said gas outlet and covers said open top of said gas canister housing, said cover-tray distributing gas about the middle a distance from said cover-tray center for burning gas and having an central adapter in line with said gas outlet for connecting a second gas burning element; and a gas burning outdoor lamp element comprising a tubular housing, a gas conduit within said tubular housing and an illuminating element wherein said conduit has a top end and a bottom end, said bottom end having a sleeve to be received by said central adapter of a multipurpose gas fire place and a pressure fit connector to receive a gas outlet within said sleeve and said top end having an adjustable gas release nozzle-venturi connected to said illuminating element.

14. A multipurpose outdoor gas fire place comprising, a frame having at least three adjustable arms for connecting to a gas canister housing having an open top and a gas outlet about the center of said frame, wherein said arms have connectors on the ends for securing said frame to said gas canister housing, wherein said at least three adjustable arms have a first adjustable arm component and a second adjustable arm component wherein said second adjustable arm component fits slidably into said first adjustable arm component;

a gas line having a first and second ends, said first end having a pressure regulator with a first adapter for securely connecting to a gas canister, the second end having a second adapter for securely connecting to said gas outlet and a gas output adjustment control valve between said first and said second ends;

a cover-tray that fits over said gas outlet and covers said open top of said gas canister housing, said cover-tray distributing gas about the middle a distance from said cover-tray center for burning gas and having an central adapter in line with said gas outlet for connecting a second gas burning element; and a gas burning outdoor barbeque element, comprising a tubular housing, a gas conduit within said tubular housing and a barbeque heating element wherein said conduit has a top end and a bottom end, said bottom end having a sleeve to be received by said central adapter of a multipurpose gas fire place and a pressure fit connector to receive a gas outlet within said sleeve and said top end having an adjustable gas release nozzle-venturi connected to said barbeque heating element.

15. A multipurpose outdoor gas fire place comprising, a frame having at least three adjustable arms for connecting to a gas canister housing having an open top and a gas outlet about the center of said frame, wherein said arms have connectors on the ends for securing said frame to said gas canister housing, wherein said at least three adjustable arms have a first adjustable arm component and a second adjustable arm component wherein said second adjustable arm component fits slidably into said first adjustable arm component;

a gas line having a first and second ends, said first end having a pressure regulator with a first adapter for securely connecting to a gas canister, the second end having a second adapter for securely connecting to said gas outlet and a gas output adjustment control valve between said first and said second ends;

a cover-tray that fits over said gas outlet and covers said open top of said gas canister housing, said cover-tray distributing gas about the middle a distance from said cover-tray center for burning gas and having an central adapter in line with said gas outlet for connecting a second gas burning element; and a gas burning outdoor torch element, comprising a tubular housing and a gas conduit within said tubular housing wherein said conduit has a top end and a bottom end, said bottom end having a sleeve to be received by said central adapter of a multipurpose gas fire place and a pressure fit connector to receive a gas outlet within said sleeve and said top end having an adjustable gas release nozzle-venturi that produces a flame.

16. A gas burning outdoor torch element according to claim 15, further comprising a cap for covering said gas release nozzle-venturi when said gas burning torch element is not in use.

* * * * *